May 14, 1963  E. T. BRINKLEY, JR  3,089,278
CONTROL HANDLE

Filed May 3, 1961  2 Sheets-Sheet 1

Edwin T. Brinkley, Jr.
INVENTOR.

BY *Clarence A. O'Brien*
*and Harvey B. Jacobson*
Attorneys

May 14, 1963

E. T. BRINKLEY, JR 3,089,278

CONTROL HANDLE

Filed May 3, 1961

Edwin T. Brinkley, Jr.
INVENTOR.

United States Patent Office 3,089,278
Patented May 14, 1963

3,089,278
CONTROL HANDLE
Edwin T. Brinkley, Jr., 710 N. Union Ave., Ozark, Ala.
Filed May 3, 1961, Ser. No. 107,466
14 Claims. (Cl. 46—77)

This invention relates to a novel and useful control handle and more particularly to a control handle specifically adapted for use with tethered model airplanes of the type having flight controls actuated by the two or more flexible lines by which they are tethered.

Most model airplanes are provided with flight control actuating means for actuating the various control surfaces of the model airplane and the actuating means usually includes a pivoted lever member to which one pair of ends of a pair of flexible control lines are secured. The ends of the control lines remote from the airplane are secured to a handle adapted to be grasped by a person flying the model airplane and the elevator control surfaces may be raised and lowered by tilting the handle backward and forward in order to increase the pull on one of the control lines while decreasing the pull on the other of the control lines.

Therefore, in order to raise the elevator control surfaces the handle is tilted backward and to lower the elevator control surfaces the handle is tilted forward. However, when the operator of the model airplane causes the latter to fly in an inverted position, the controls are in effect reversed and it then becomes necessary to tilt the handle backward to lower the elevator control surfaces and forward to raise the elevator control surfaces. Thus, the individual flying the model airplane must bear in mind two sets of controls and be able to bear in mind at all times which set of controls are to be used according to whether the model airplane is being flown in an upright position or in an inverted position.

Inasmuch as model airplanes do not operate as reliably as their full sized counterparts and they are normally flown until their fuel tanks run dry, the individual flying a model airplane must at all times be ready to effect level upright flight of the model airplane in preparation to landing of the same should the motor begin to malfunction or the fuel tanks run dry. If the motor malfunctions or the fuel tanks run dry, when the plane is flying in an inverted position, the natural reflex of the individual flying the airplane is to tilt the handle backward in order to effect upward movement of the elevator control surfaces in preparation for landing. However, when the model airplane is flying inverted, before effecting upward control of the elevator surfaces the individual must first return the model airplane to its normal upright position. If the individual does not bear in mind at all times while flying the plane in an inverted position that the controls are reversed, should it become necessary that he return the model airplane to an upright position as soon as it is possible, he is liable to tilt the handle backward which will cause the inverted model airplane to dive into the ground.

In addition to having to bear in mind at all times which set of controls are to be used when the model airplane is flying in an inverted position, the individual flying the airplane will find that the control lines will become twisted if a series of loops are executed by the airplane. In order to return the control lines to their normal position after three or four loops the individual flying the airplane must then have the airplane execute loops in the opposite direction in order that the control lines may again be returned to their normal position.

It is the main object of this invention to provide a means for securing the control lines to the handle operated by the individual flying the airplane in a manner whereby the position of the spaced control wires may be reversed relative to each other as desired by the individual flying the airplane. A further object of this invention is to provide a means for rotatably mounting an elongated bar member to the control handle and to provide the elongated bar member with means in opposite ends thereof for engagement by the control wires of the airplane. In this manner, the rod may be reversed in position as desired in order to maintain the control wires of the airplane in a normal position.

A further object of this invention is to provide a means for resiliently urging rotation of the control bar in one direction only whereby stop means may be provided to determine the amount of rotation of the control rod.

A further object of this invention, in accordance with the preceding object, is to provide a simple control for the limit means which will enable the individual flying the airplane to reverse the position of the control rod with a minimum amount of effort.

A final object to be specifically enumerated herein is to provide a device which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
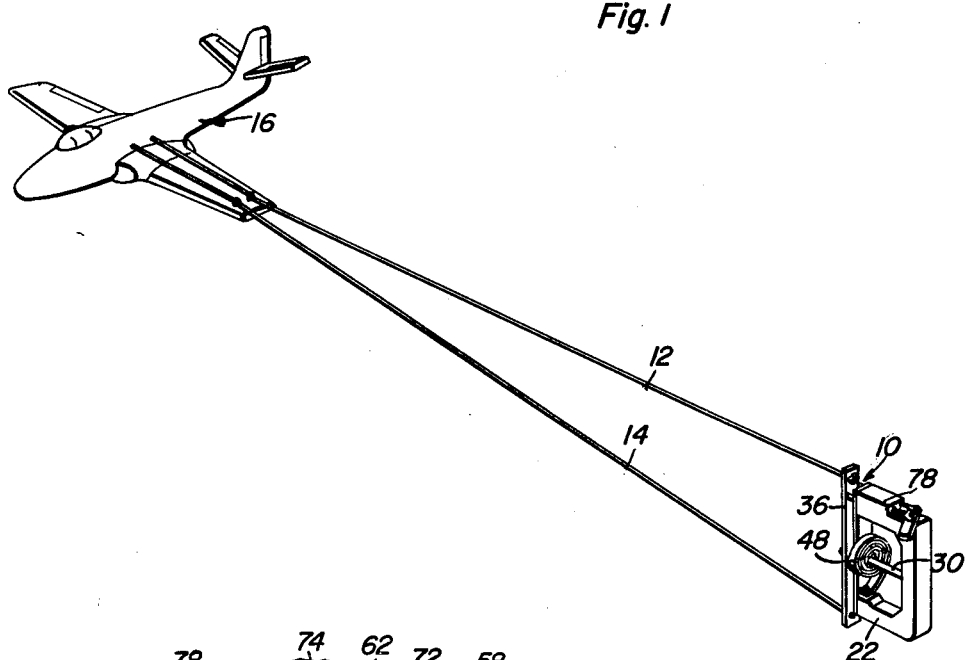
FIGURE 1 is a perspective view of a model airplane in flight shown with a control handle of the instant invention secured to the ends of the control lines of the model airplane remote from the plane.

Referring now more specifically to the drawings, the numeral 10 generally designates the control handle of the instant invention which is shown in FIGURE 1 of the drawings operatively connected to the ends of two control lines 12 and 14 remote from the model airplane generally designated by the reference numeral 16 to which they are secured.

The control lines 12 and 14 are flexible and the handle 10 is utilized to increase the pull on one of the control lines while decreasing the pull on the other of the control lines. This change of pull on the control lines may be effected by pivoting the control handle assembly 10 back and forth about an axis extending transversely of the plane in which the control handle is disposed.

Referring now more specifically to FIGURES 2 through 5 of the drawings it will be seen that the control handle 10 includes a generally U-shaped body referred to in general by the reference numeral 18. The body 18 includes a pair of generally parallel legs 20 and 22 interconnected at one end by means of a bight portion 24. Normally, the lines 12 and 14 will have their ends remote form the airplane 16 secured to the ends of the legs 20 and 22 respectively remote from the bight portion 24 in any conventional and convenient manner. However, the control handle 10 is provided with a mounting plate 26 provided with an outer mounting face 28. An axle shaft 30 is mounted for rotation on the handle 10 with its opposite ends received in the blind bore 32 formed in the bight portion 24 and the aperture 34 formed in the mounting plate 26. A mounting member 36 in the form of an elongated rod is secured to the forward end of the axle shaft 30 by means of a threaded fastener 38 which secures the diametrically reduced forward end portion 40 of the axle shaft 30 through the bore 42 which extends transversely through the mounting member 36 intermediate the opposite ends thereof. The mounting members 36 is provided with bores 44 in its opposite end portions by which the lines 12 and 14 are secured to the mounting member 36. A spacing member 46 is disposed between the confronting surfaces of the mounting member 36 and the mounting face 28 in order to maintain the mounting member 36 in spaced relation relative to the mounting plate 26. The inner end of a coil spring 48 is secured to the axle shaft 30 in any convenient manner and the outer end of the coil spring 48 is secured to the handle body 18 by means of fastener 50.

The mounting plate 26 is secured between the outer ends of the legs 20 and 22 by means of fasteners 52 which are pasesd through apertures 54 formed in the opposite ends of the mounting plate 26 and secured in the legs 20 and 22 of the handle body 18.

Figure 2:
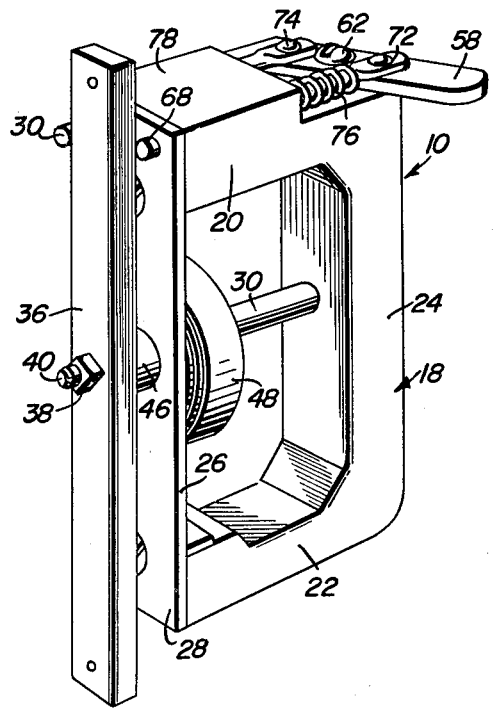
FIGURE 2 is an enlarged perspective view of the control handle.
Figure 3:
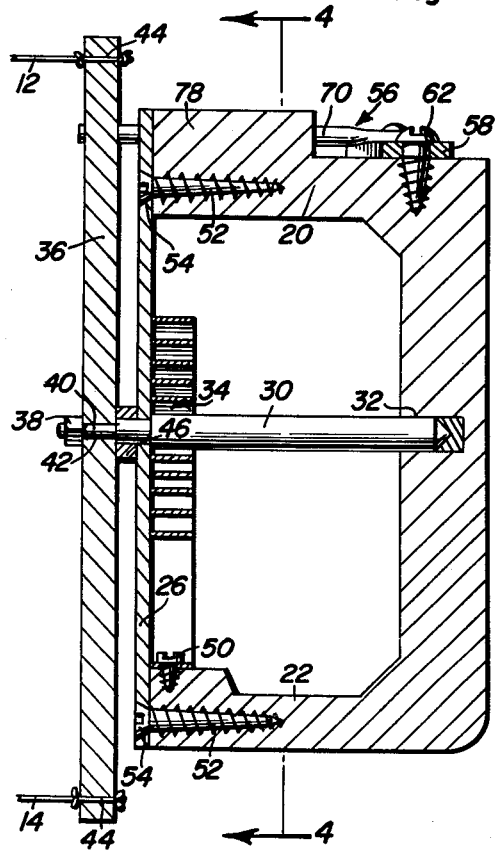
FIGURE 3 is an enlarged vertical sectional view taken substantially upon a plane passing through a center of the control handle.
Figure 4:
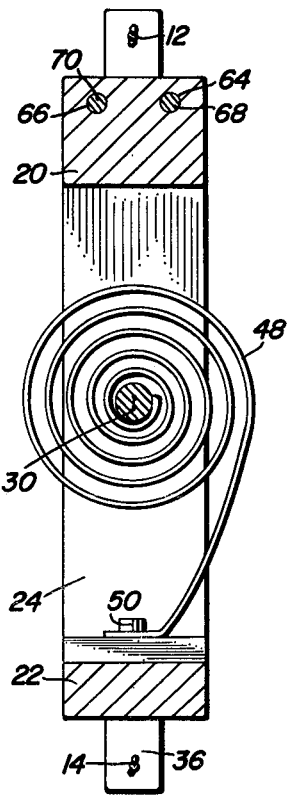
FIGURE 4 is a transverse vertical sectional view taken substantially upon a plane indicated by the section line 4—4 of FIGURE 3.
Figure 5:
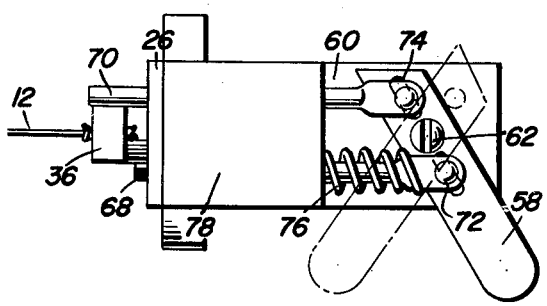
FIGURE 5 is a top plan view of the control handle showing an alternate position of the actuator therefor in phantom lines.

It may now be appreciated that if the control member 26 is rotated about its axis of rotation in a counter-clockwise direction as viewed in FIGURE 2 of the drawings that the coil spring 48 will be wound and will resiliently urge the axle shaft 30 to rotate in a clockwise direction.

A limit means in the form of an actuating assembly generally referred to by the reference numeral 56 is provided and includes an actuator lever 58 pivotally secured within a recess 60 on top of the handle body 18 by means of a pivot fastener 62. A pair of generally parallel bores 66 and 64 are formed in the leg 20 of the handle body 18 and a pair of pins 68 and 70 are slidingly received in the bore 64 and 66 respectively. The pin 68 defines a stop member and the pin 70 defines a release member. The pins 68 and 70 are connected to the lever 58 on opposite sides of the pivot fastener 62 by means of pin and slot connections 72 and 74 and a compression spring 76 is disposed about the pin 68 and between the lever 58 and the mounting boss 78 of the leg 20 through which the bores 64 and 66 are formed to resiliently urge the end of the pin 68 remote from the lever 58 to a retracted position as illustrated in the drawings. With the stop pin 68 resiliently urged to a retracted position, the release pin 70 is resiliently urged to the extended position. The pins 68 and 70 are spaced apart from each other a distance sufficient to receive therebetween the control member 36.

In operation, before the plane 16 is to be flown, the control member 36 is rotated to wind the spring 48. Then, the compression spring 76 will retain the lever 58 in the position illustrated in FIGURE 5 of the drawings whereupon the release pin 70 will prevent the rotation of the control member 36. When flying the airplane 16, by effecting inverting flying of the airplane 16 the lines 12 and 14 will have their ends adjacent the airplanes 16 reversed in position. Accordingly, the individual flying the airplane 16 may then push the end of the lever 58 remote from the pin and slot connection 74 to release the control member 36 whereupon it will rotate approximately 180° until engaging the pin 68 which will then be extended. The individual flying the airplane 16 may then release the lever 58 whereupon the pin 68 will be retracted while at the same time extending the release pin 70 in order to enable the control member 36 to complete its 180° rotation. At this time, while the plane 16 is flying inverted, a rearward pull on the top of the handle body 18 will operate the control surfaces of the airplane 16 to make it raise above the ground. As soon as the airplane 16 is again returned to level upright flight, the lever 58 may then again be manipulated to effect a further 180° rotation of the control member 36. If the airplane 16 is caused to fly one or more loops, the lever 58 may be engaged again to enable the control member 36 to be rotated a sufficient number of times about its axis of rotation in order to untwist the control lines 12 and 14.

It is to be understood that the control handle has been constructed in a manner whereby modifications of the present invention may readily be incorporated therein. The mounting plate could also be rotatably mounted on the axle shaft 30 and resiliently urged to rotate in a direction opposite to the direction of rotation of the control member 36 in this instance, the control wires 12 and 14 could be reversed in position by moving the ends thereof remote from the plane 16 about an axis of rotation in either direction thus enabling the control member 36 to be moved to compensate for inside and outside loops. Additionally, the control member 36 could be provided with a longitudinal bore communicating in opposite ends with the bores 44 and at the center of the control member 36 with a longitudinal bore formed through the axle shaft 30 whereupon winding means of any conventional form could be utilized on the back end of the handle body 18 to reel in and out the control lines 12 and 14. In this manner, the control handle 10 could be used to lengthen or shorten the control lines 12 and 14, and also to rotate the ends of the lines 12 and 14 remote from the airplane 16 in either direction in order to return the control lines to their normal position after executing both inside and outside loops.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A control handle for use with tethered model airplanes of the type having flight control actuating means adapted to have a plurality of generally parallel and spaced flexible tethering and control lines secured thereto, said control handle comprising a hand-grip, a control member, means rotatably mounting said control member on said grip, a pair of generally parallel lines, securing means securing one pair of corresponding end portions of said lines to said control member in spaced relation for lateral swinging movement of said lines about an axis paralleling said lines upon rotation of said control member and means for effecting rotation of said control member relative to said grip.

2. The combination of claim 1 including means for limiting rotation of said control member to movement of substantially 180°.

3. The combination of claim 1 wherein said rotation effecting means resiliently urges rotation of said control member in one direction only.

4. The combination of claim 1 wherein said rotation effecting means resiliently urges rotation of said control member in one direction only, and means for limiting rotation of said control member to movement of substantially 180°.

5. The combination of claim 4 wherein said limit means includes release and stop members selectively engageable with said control member.

6. The combination of claim 5 including an actuator movably mounted on said handle for easy access thereto by a person holding the handle, means connecting said stop and release members to said actuator for actuation thereby to move said stop member into position for engagement with said control member upon movement of said release member out of engagement with said control member and to move said release member into position for engagement with said control member upon movement of said stop member out of engagement with said control member.

7. The combination of claim 6 wherein said control member comprises an elongated control bar with said securing means disposed on opposite end portions thereof, said mounting means rotatably mounting said bar for rotation about an axis extending transversely of said bar intermediate the opposite ends thereof.

8. The combination of claim 7 wherein said stop and release members are carried by said handle and include portions movable transversely of and into and out of the plane in which said bar rotates, said stop and release members being spaced radially of the axis of rotation of said control member and apart from each other a distance to receive therebetween an end of said control member.

9. The combination of claim 1 wherein said handle includes a mounting face, said mounting means mounting said control member for rotation about an axis extending transversely of said face in a plane spaced slightly from said face, an actuator movably mounted on said handle for easy access thereto by a person holding said handle, means resiliently urging rotation of said control member, means limiting rotation of said control member to individual movement of substantially 180°, said limit means including release and stop members selectively engageable with said control member, means connecting said stop and release members to said actuator for actuation thereby to move said stop member into position for engagement with said control member upon movement of said release member out of engagement with said control member and to move said release member into position for engagement with said control member upon movement of said stop member out of engagement with said control member.

10. The combination of claim 9 wherein said stop and release members are carried by said handle and include portions movable transversely of and into and out of the plane in which said bar rotates, said stop and release members being spaced radially of the axis of rotation of said control member and apart from each other a distance to receive therebetween an end of said control member.

11. A control assembly for use with tethered model airplanes of the type having flight control actuating means adapted to have a plurality of generally parallel and spaced flexible tethering and control lines secured thereto, said control assembly comprising a mounting member, a control member, means rotatably mounting said control member on said mounting member, a pair of generally parallel lines, securing means securing one pair of corresponding end portions of said lines to said control member in spaced relation for lateral swinging movement of said lines about said axis upon rotation of said control member, and means for effecting rotation of said control member relative to said mounting member in one direction only.

12. The combination of claim 11 including means for limiting rotation of said control member to movement of substantially 180°.

13. The combination of claim 12 wherein said limit means includes release and stop members selectively engageable with said control member.

14. The combination of claim 1 wherein said control member comprises an elongated control bar with said securing means disposed on opposite end portions of said control bar, said mounting means rotatably mounting said bar for rotation about an axis extending transversely of said bar intermediate the opposite end portions of said bar and the securing means carried thereby.

References Cited in the file of this patent

UNITED STATES PATENTS 2,807,426     Kelem et al.     Sept. 24, 1957